(12) United States Patent
Dadalas et al.

(10) Patent No.: US 6,861,466 B2
(45) Date of Patent: Mar. 1, 2005

(54) FLUOROPOLYMER DISPERSION CONTAINING NO OR LITTLE LOW MOLECULAR WEIGHT FLUORINATED SURFACTANT

(75) Inventors: Michael C. Dadalas, Eggenfelden (DE); Leonard W. Harvey, Downingtown, PA (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 10/761,086

(22) Filed: Jan. 20, 2004

(65) Prior Publication Data

US 2004/0171736 A1 Sep. 2, 2004

(30) Foreign Application Priority Data

Feb. 28, 2003 (EP) .............................. 03100513

(51) Int. Cl.$^7$ ................................. C08J 3/00
(52) U.S. Cl. .................. 524/544; 526/242; 526/248; 526/250; 526/805; 524/805
(58) Field of Search ................. 526/242, 248, 526/280, 805; 524/544

(56) References Cited

U.S. PATENT DOCUMENTS

| | | | |
|---|---|---|---|
| 3,037,953 A | | 6/1962 | Marks et al. |
| 3,345,317 A | * | 10/1967 | Hoashi ................. 524/742 |
| 3,489,595 A | | 1/1970 | Brown |
| 4,282,162 A | * | 8/1981 | Kuhls ................. 554/193 |
| 4,353,950 A | | 10/1982 | Vassiliou |
| 4,369,266 A | | 1/1983 | Kuhls et al. |
| 4,623,487 A | * | 11/1986 | Cope ................. 554/185 |
| 5,229,480 A | | 7/1993 | Uschold |
| 5,453,477 A | * | 9/1995 | Oxenrider et al. ........ 526/230 |
| 5,688,884 A | | 11/1997 | Baker et al. |
| 5,700,859 A | | 12/1997 | Ogura et al. |
| 5,763,552 A | | 6/1998 | Feiring et al. |
| 5,804,650 A | | 9/1998 | Tsuda et al. |
| 5,895,799 A | | 4/1999 | Wu et al. |
| 5,955,556 A | * | 9/1999 | McCarthy et al. ........ 526/249 |
| 6,025,307 A | | 2/2000 | Chittofrati et al. |
| 6,103,843 A | | 8/2000 | Abusleme et al. |
| 6,126,849 A | | 10/2000 | Yamana et al. |
| 6,153,688 A | | 11/2000 | Miura et al. |
| 6,429,258 B1 | * | 8/2002 | Morgan et al. ............ 524/805 |
| 6,642,307 B1 | | 11/2003 | Sogabe et al. |
| 6,642,415 B1 | * | 11/2003 | Fuhrer et al. ............. 562/602 |
| 2003/0125421 A1 | * | 7/2003 | Bladel et al. ............. 523/310 |
| 2003/0130393 A1 | * | 7/2003 | Cavanaugh et al. ........ 524/366 |
| 2003/0220442 A1 | * | 11/2003 | Epsch et al. ............. 524/545 |

FOREIGN PATENT DOCUMENTS

| | | |
|---|---|---|
| EP | 0 022 257 B1 | 1/1981 |
| EP | 0 712 882 A1 | 5/1996 |
| EP | 0 718 364 A1 | 6/1996 |
| EP | 0 739 960 A1 | 10/1996 |
| EP | 0 752 432 B1 | 1/1997 |
| EP | 0 816 397 B1 | 1/1998 |
| EP | 0 818 506 A1 | 1/1998 |
| EP | 1 059 333 A1 | 12/2000 |
| EP | 1 059 342 A1 | 12/2000 |
| GB | 642 025 | 8/1950 |
| GB | 966 814 A | 8/1964 |
| JP | 2002-179870 * | 6/2002 |
| WO | WO 94/14904 | 7/1994 |
| WO | WO 96/24622 | 8/1996 |
| WO | WO 97/17381 | 5/1997 |
| WO | WO 00/35971 | 6/2000 |
| WO | WO 03/020836 A1 | 3/2003 |

OTHER PUBLICATIONS

W. C. Griffin "Calculation of HLB Values of Non–Ionic Surfactants", *Journal of the Society of Cosmetic Chemists*, vol. 5, (1954) p. 259.

* cited by examiner

*Primary Examiner*—David W. Wu
*Assistant Examiner*—Henry S. Hu
(74) *Attorney, Agent, or Firm*—Brian E. Szymanski

(57) ABSTRACT

In an aspect of the invention, a fluoropolymer dispersion, preferably a PTFE dispersion, is provided that comprises fluoropolymer particles having an average particle size of 10 to 400 nm dispersed in water whereby the dispersion has an amount of solids between 35 and 70% by weight. The dispersion is free of fluorinated surfactant having a molecular weight of less than 1000 g/mol (hereinafter called low molecular weight fluorinated surfactant) or contains the low molecular weight fluorinated surfactant in an amount of not more than 0.05% by weight based on the total weight solids of the dispersion. The dispersion further comprises a non-ionic non-fluorinated surfactant or mixture of non-ionic non-fluorinated surfactants and one or more non-fluorinated anionic surfactants. Through the use of a non-fluorinated anionic surfactant, a dispersion is obtained that has a low viscosity at room temperature (20° C.). The dispersion is further free of aromatic group containing non-ionic surfactants and is accordingly environmentally more friendly and can yield coatings that are less susceptible of discoloration. The amount and nature of the non-ionic non-fluorinated surfactant or mixture of non-ionic non-fluorinated surfactants is selected such that the Viscosity Transition Temperature (VTT) (measured as set forth in the examples) of the fluoropolymer dispersion is at least 26, preferably at least 28° C. In a further aspect of the invention, a method is provided to obtain the aforementioned dispersion.

11 Claims, No Drawings

FLUOROPOLYMER DISPERSION CONTAINING NO OR LITTLE LOW MOLECULAR WEIGHT FLUORINATED SURFACTANT

This application claims priority from European Patent Application Serial No. 03100513.5, filed Feb. 28, 2003.

1. FIELD OF THE INVENTION

The present invention relates to aqueous fluoropolymer dispersions that are free of low molecular weight fluorinated surfactant or that contain the latter in low amounts. In particular, the present invention relates to reducing the viscosity of such fluoropolymer dispersions that are high in solids content and that contain non-ionic surfactants as a stabilizer.

2. BACKGROUND OF THE INVENTION

Fluoropolymers, i.e. polymers having a fluorinated backbone, have been long known and have been used in a variety of applications because of several desirable properties such as heat resistance, chemical resistance, weatherability, UV-stability etc . . . . The various fluoropolymers are for example described in "Modern Fluoropolymers", edited by John Scheirs, Wiley Science 1997. The fluoropolymers may have a partially fluorinated backbone, generally at least 40% by weight fluorinated, or a fully fluorinated backbone. Particular examples of fluoropolymers include polytetrafluoroethylene (PTFE), copolymers of tetrafluoroethylene (TFE) and hexafluoropropylene (HFP) (FEP polymers), perfluoroalkoxy copolymers (PFA), ethylenetetrafluoroethylene (ETFE) copolymers, terpolymers of tetrafluoroethylene, hexafluoropropylene and vinylidene fluoride (THV) and polyvinylidene fluoride polymers (PVDF).

The fluoropolymers may be used to coat substrates to provide desirable properties thereto such as for example chemical resistance, weatherability, water- and oil repellency etc . . . . For example aqueous dispersions of fluoropolymer may be used to coat kitchen ware, to impregnate fabric or textile e.g. glass fabric, to coat paper or polymeric substrates. For sake of economy and convenience, the fluoropolymer dispersions will typically have between 35% by weight and 70% by weight of fluoropolymer solids.

A frequently used method for producing aqueous dispersions of fluoropolymers involves aqueous emulsion polymerization of one or more fluorinated monomers usually followed by an upconcentration step to increase the solids content of the raw dispersion obtained after the emulsion polymerization. The aqueous emulsion polymerization of fluorinated monomers generally involves the use of a fluorinated surfactant. Frequently used fluorinated surfactants include perfluorooctanoic acids and salts thereof, in particular ammonium perfluoiooctanoic acid. Further fluorinated surfactants used include perfluoropolyether surfactants such as disclosed in EP 1059342, EP 712882, EP 752432, EP 816397, U.S. Pat. Nos. 6,025,307, 6,103,843 6,126,849. Still further surfactants that have been used are disclosed in U.S. Pat. Nos. 5,229,480, 5,763,552, 5,688,884, 5,700,859, 5,804,650, 5,895,799, WO 00/22002 and WO 00/71590.

Most of these fluorinated surfactants have a low molecular weight, i.e. a molecular weight of less than 1000 g/mol. Recently, such low molecular weight fluorinated compounds have raised environmental concerns. Accordingly, measures have been taken to either completely eliminate the fluorinated low molecular weight surfactants from aqueous dispersion or at least to minimize the amount thereof in an aqueous dispersion. For example, WO 96/24622 and WO 97/17381 disclose an aqueous emulsion polymerization to produce fluoropolymers whereby the polymerization is carried out without the addition of fluorinated surfactant. U.S. Pat. No. 4,369,266 on the other hand discloses a method whereby part of fluorinated surfactant is removed through ultrafiltration. In the latter case, the amount of fluoropolymer solids in the dispersion is increased as well, i.e. the dispersion is upconcentrated while removing fluorinated surfactant. WO 00/35971 further discloses a method in which the amount of fluorinated surfactant is reduced by contacting the fluoropolymer dispersion with an anion exchanger.

Since the solids content of the raw dispersions immediately after emulsion polymerization is usually in the range of up to 30% by weight, the raw dispersions are subjected to an upconcentration process so as to increase the solids content thereof. In order to preserve the stability of the dispersion, the upconcentration typically is carried out in the presence of a stabilizer, in particular a non-ionic surfactant that acts as a stabilizer.

However, when fluoropolymer dispersions that contain no or only a small amount of fluorinated low molecular weight surfactant are upconcentrated, it was found that a viscosity increase results which may be unacceptable. Moreover, the stability of the upconcentrated dispersions may under certain conditions be inferior to dispersions in which the amount of low molecular weight fluorinated surfactant is higher.

In applicant's WO patent application no. US02/25114 filed Aug. 6, 2002, the aforementioned increase in viscosity was reduced by adding a non-fluorinated anionic surfactant to the dispersion. As a result, the viscosity of the dispersion could be adjusted to a level that is comparable to that of a dispersion containing large amounts of the fluorinated surfactant. Although the application discloses several possible non-ionic surfactants, all of the examples were carried out with TRITON™ X-100 (an ethoxylated alkylphenol surfactant), which is a commonly used non-ionic surfactant for fluoropolymer dispersions. This surfactant has the disadvantage of being objected to from an environmental point of view. Further, this surfactant may cause undesirable discoloring in coatings produced from dispersions containing this surfactant.

In U.S. Pat. No. 6,153,688 dispersions of polytetrafluoroethylene (PTFE) have been disclosed that contain between 35 and 65% by weight of PTFE and between 2 and 10% by weight relative to PTFE of a polyoxyethylene alkyl ether non-ionic surfactant. The latter is selected such that the cloud point thereof is more than 45° C. and the amount of ethylene oxide is between 65 and 70% by weight. It is taught that such dispersions offer the advantage of being free of aromatic group containing surfactants while still having good coating properties as the viscosity at room temperature is low. But, the dispersions are apparently prepared in the known way with the use of fluorinated surfactant and therefore are believed to have a high amount of fluorinated surfactant.

It would now be desirable to find further aqueous dispersions of fluoropolymer, in particular PTFE, that are free of or substantially free of low molecular weight fluorinated surfactant and that are free of non-ionic surfactant having an aromatic group. Also, it is desirable that such dispersions have good coating properties in particular for impregnation of fabrics. Desirably, the good coating properties are obtained over a commercially feasible range of operating conditions, in particular with respect to ambient conditions.

Further, desirably, the dispersion has good film forming properties comparable or better as dispersions that contain the low molecular weight fluorinated surfactant in large amounts.

3. SUMMARY OF THE INVENTION

In an aspect of the invention, a fluoropolymer dispersion, preferably a PTFE dispersion, is provided that comprises fluoropolymer particles having an average particle size of 10 to 400 nm dispersed in water whereby the dispersion has an amount of solids between 35 and 70% by weight. The dispersion is free of fluorinated surfactant having a molecular weight of less than 1000 g/mol (hereinafter called low molecular weight fluorinated surfactant) or contains the low molecular weight fluorinated surfactant in an amount of not more than 0.05% by weight based on the total weight solids of the dispersion. The dispersion further comprises a non-ionic non-fluorinated surfactant or mixture of non-ionic non-fluorinated surfactants and one or more non-fluorinated anionic surfactants. Through the use of a non-fluorinated anionic surfactant, a dispersion is obtained that has a low viscosity at room temperature (20° C.). The dispersion is further free of aromatic group containing non-ionic surfactants and is accordingly environunentally more friendly and can yield coatings that are less susceptible of discoloration. The amount and nature of the non-ionic non-fluorinated surfactant or mixture of non-ionic non-fluorinated surfactants is selected such that the Viscosity Transition Temperature (VTT) (measured as set forth in the examples) of the fluoropolymer dispersion is at least 26, preferably at least 28° C.

Fluoropolymer dispersions and in particular PTFE dispersions in accordance with the present invention can be conveniently used to coat several types of substrates and are in particular suitable for impregnation. They can be employed under a variety of ambient conditions and typically have good to excellent film forming properties.

The invention in a further aspect relates to a method of providing a fluoropolymer particle dispersion as defined above comprising the steps of:

(a) providing a fluoropolymer dispersion comprising fluoropolymer particles having an average particle size of 10 to 400 nm and comprising fluorinated surfactant having a molecular weight of less than 1000 g/mol or being free thereof;

(b) reducing the amount of said fluorinated surfactant in said dispersion if the amount thereof is more than 0.05% by weight based on the total weight of solids of the dispersion in the presence of a non-ionic non-fluorinated surfactant or mixture of non-ionic non-fluorinated surfactants;

(c) upconcentrating the fluoropolymer dispersion in the presence of a non-ionic non-fluorinated surfactant or mixture of non-ionic non-fluorinated surfactants so as to increase the amount of fluoropolymer solids in said dispersion to a level between 35% and 75% by weight; and (d) adding one ore more non-fluorinated anionic surfactants to the fluoropolymer dispersion prior to or after upconcentrating said fluoropolymer dispersion;

wherein said non-ionic non-fluorinated surfactant or mixture of non-ionic non-fluorinated surfactants used in said step (b) and/or (c) are selected such that the fluoropolymer dispersion after step (d) has a VTT of at least 26° C. or alternatively, further one or more non-ionic non-fluorinated surfactants are added to adjust the VTT of the fluoropolymer dispersion to at least 26° C. and wherein said non-ionic non-fluorinated surfactants are selected such that the fluoropolymer dispersion is free from aromatic group containing non-ionic surfactant.

4. DETAILED DESCRIPTION OF THE INVENTION

The fluoropolymer dispersions are free of low molecular weight fluorinated surfactant or contain the latter in low amounts, e.g. less than 0.025% by weight (based on the total weight of solids, in particular on the total weight of fluoropolymer solids in the dispersion), preferably not more than 0.01% by weight and most preferably less than 0.005% by weight and contain a non-fluorinated anionic surfactant. The dispersion typically has a suitable low viscosity between 10 and 40 mpa*s, preferably between 15 and 35 mpa*s, more preferably between 15 and 30 mpa*s at a temperature of 20° C.

Preferred anionic non-fluorinated surfactants are surfactants that have an acid group that has a $pK_a$ of not more than 4, preferably not more than 3. Examples of non-fluorinated anionic surfactants include surfactants that have one or more anionic groups. Anionic non-fluorinated surfactants may include in addition to one or more anionic groups also other hydrophilic groups such as polyoxyalkylene groups having 2 to 4 carbons in the oxyalkylene group, such as polyoxyethylene groups, or groups such as amino groups. Nevertheless, when amino groups are contained in the surfactant, the pH of the dispersion should be such that the amino groups are not in their protonated form. Typical non-fluorinated surfactants include anionic hydrocarbon surfactants. The term "anionic hydrocarbon surfactants" as used herein comprises surfactants that comprise one or more hydrocarbon moieties in the molecule and one or more anionic groups, in particular acid groups such as sulphonic, sulfuric, phosphoric and carboxylic acid groups and salts thereof. Examples of hydrocarbon moieties of the anionic hydrocarbon surfactants include saturated and unsaturated aliphatic groups having for example 6 to 40 carbon atoms, preferably 8 to 20 carbon atoms. Such aliphatic groups may be linear or branched and may contain cyclic structures. The hydrocarbon moiety may also be aromatic or contain aromatic groups. Additionally, the hydrocarbon moiety may contain one or more hetero atoms such as for example oxygen, nitrogen and sulfur.

Particular examples of anionic hydrocarbon surfactants for use in this invention include alkyl sulfonates such as lauryl sulfonate, alkyl sulfates such as lauryl sulfate, alkylarylsulfonates and alkylarylsulfates, fatty (carboxylic) acids and salts thereof such as lauric acids and salts thereof and phosphoric acid alkyl or alkylaryl esters and salts thereof. Commercially available anionic hydrocarbon surfactants that can be used include Polystep™ A16 (sodium dodecylbenzyl sulphonate) from Stepan Company, Hostapur™ SAS 30 (secondary alkyl sulphonate sodium salt), Emulsogen™ LS (sodium lauryl sulfate) and Emulsogen™ EPA 1954 (mixture of $C_{12}$ to $C_{14}$ sodium alkyl sulfates) available from Clariant GmbH and TRITON™ X-200 (sodium alkylsulfonate) available from Union Carbide. Preferred are anionic hydrocarbon surfactants having a sulfonate group.

Other suitable anionic non-fluorinated surfactants include silicone based surfactants such as polydialkylsiloxanes having pending anionic groups such as phosphoric acid groups, carboxylic acid groups, sulfonic acid groups and sulfuric acid groups and salts thereof.

The amount of anionic surfactant added to the fluoropolymer dispersion will generally depend on the nature of the fluorinated surfactant, nature and amount of the fluoropolymer, nature and amount of non-ionic surfactant present in the dispersion and nature and amount of low molecular weight fluorinated surfactant that may be present in the fluoropolymer dispersion. Typically, the amount of anionic surfactant will be between 10 ppm and 5000 ppm, preferably between 100 ppm and 3000 ppm, more preferably between 100 ppm and 2500 ppm based on the weight of the fluoropolymer solids in the dispersion. When too low amounts of the anionic surfactant are used, an undesirable high viscosity may result. On the other hand, when too large amounts of the anionic surfactant are added the viscosity may also raise. If it is further desired or needed to increase the stability of the dispersion, it may be necessary to use the anionic surfactant in an amount of at least 2000 ppm based on the weight of fluoropolymer solids. The optimal concentration of the anionic surfactant in the dispersion can be easily determined by one skilled in the art through routine experimentation.

The low molecular weight fluorinated surfactant, when present, may be any of the low molecular weight fluorinated surfactants that can be used in the emulsion polymerization of fluorinated monomers and include in particular those that have been mentioned above in respect of the discussion of the prior art. Commonly used low molecular weight fluorinated surfactants are telogenic and include those that correspond to the formula:

$$Y-R_f-Z-M \quad (A)$$

wherein Y represents hydrogen, Cl or F; $R_f$ represents a linear or branched perfluorinated alkylene having 4 to 10 carbon atoms; Z represents $COO^-$ or $SO_3^-$ and M represents a mono- or multi-valent cation such as an alkali metal ion or an ammonium ion.

The low molecular weight fluorinated surfactant, when present in the fluoropolymer dispersion, is typically present in amounts of less than 0.025% by weight, preferably not more than 0.01% by weight and most preferably not more than 50 ppm based on the total amount of solids in the dispersion.

The fluoropolymer dispersion also includes a non-ionic surfactant or mixture of non-ionic surfactants. The non-ionic surfactant is a non-fluorinated non-ionic surfactant. Typically, the non-ionic surfactant is a surfactant that contains one or more saturated or unsaturated aliphatic moieties linked to one or more non-ionic hydrophilic groups. The saturated or unsaturated aliphatic moieties may include linear, branched and/or cyclic structures and they can be linked to the non-ionic hydrophilic group through a functional group such as an ester, ether linkage, amide linkage etc . . . . The non-ionic hydrophilic group generally comprises oxyalkylene groups in which the alkylene group has 2, 3 or 4 carbon atoms. For example, the non-ionic hydrophilic group may be a polyoxyethylene group, a polyoxypropylene group or a copolymer, including blockcopolymers, comprising oxyethylene and oxypropylene groups.

In accordance with the invention, the non-ionic surfactant or mixture of non-ionic surfactant is selected such that the resulting dispersion has a VTT of at least 26° C., preferably at least 28° C. To achieve the desired VTT, the nature and amount of the non-ionic surfactant or mixture thereof should be considered. Also, the viscosity at 20° C. and the VTT may depend on the other components present in the dispersion, in particular the type of anionic surfactant that is used. For the same non-ionic surfactant or mixture of non-ionic surfactants, an increased amount of the surfactant will typically result in a lowering of the VTT. On the other hand the amount should not be selected so low that the film forming properties of the dispersion are impaired. The proper amount of non-ionic surfactant or mixture of non-ionic surfactants will depend on the nature of the surfactant or mixture and can be readily determined by one skilled in the art. Generally, the amount of non-ionic surfactant or the total amount if a mixture is used, will be between 3 and 12% by weight based on the total weight of solids in the dispersion preferably between 4 and 10% by weight.

Further, the nature of the non-ionic surfactant is another consideration in obtaining the desired VTT. To obtain the desired VTT in a dispersion that is free or substantially free of low molecular weight fluorinated surfactant and that contains an anionic non-fluorinated surfactant, the hydrophobic and hydrophilic moieties in the surfactant or surfactant mixture should be properly balanced. Thus, when the amount and/or length of the hydrophobic moieties becomes too large relative to the length and amount of hydrophilic moieties in the non-ionic surfactant or non-ionic surfactant mixture, the VTT will become too low. On the other hand, the amount and length of hydrophilic groups in the non-ionic surfactant or non-ionic surfactant mixture, should not be chosen too high relative the hydrophobic part of the surfactant or mixture as too much hydrophilicity will generally reduce the film forming properties of the dispersion. One skilled in the art will be able with this guidance to select appropriate non-ionic surfactants and mixtures of non-ionic surfactants for a particular dispersion to achieve the necessary VTT of at least 26° C., preferably at least 28° C.

Examples of non-ionic surfactants that can be used in connection with the invention to adjust the dispersion to a VTT of at least 26° C. can be selected from the group of polyoxyalkylene alkyl ether surfactants, polysorbates and alkoxylated acetylenic diols, preferably ethoxylated acetylenic diols. Preferably, the non-ionic surfactant or non-ionic surfactant mixture used will have an HLB (hydrophilic lypophilic balance) between 11 and 16. The HLB number was introduced by W. C. Griffin "Calculation of HLB Values of Non-Ionic Surfactants," *Journal of the Society of Cosmetic Chemists* 5 (1954), p. 259 to characterize surfactants. The HLB number of non-ionic surfactants having only ethyleneoxide groups can be calculated according to the formula HLB=E/5 where E represents the weight % of ethyleneoxide groups. In case of a mixture of surfactants, the HLB value can be calculated according to the formula:

$$HLB = \sum_{i=n} HLBi^* wi.$$

wherein $HLB_i$ represents the HLB of surfactant i and $w_i$ represents the weight fraction of surfactant i in the surfactant mixture and n represents the number of different surfactants making up the surfactant mixture.

In one embodiment, the non-ionic surfactant or mixture of non-ionic surfactants corresponds to the general formula:

$$R^1-O-[CH_2CH_2O]_n-[R^2O]_m-R^3 \quad (I)$$

wherein $R^1$ represents an aliphatic hydrocarbon group having at least 8 carbon atoms, preferably 8 to 18 carbon atoms, $R^2$ represents an alkylene having 3 carbon atoms, $R^3$ represents hydrogen or a $C_1-C_3$ alkyl group, n has a value of 0 to 40, m has a value of 0 to 40 and the sum of n+m is at least 2. When the above general formula represents a mixture, n and m will represent the average amount of the respective groups. Also, when the above formula represents a mixture, the indicated amount of carbon atoms in the aliphatic group $R^1$ may be an average number representing the average length of the aliphatic group in the surfactant mixture. Depending on the amount of non-ionic surfactant selected, a surfactant or surfactant mixture having an HLB between 11 and 16, preferably between 12 and 15 can be used to obtain a VTT of the dispersion of at least 26° C. For example, a non-ionic surfactant or mixture of non-ionic surfactants according to formula (I) in which m=0 and which surfactant or mixture of surfactants has an HLB between 11 and 16, preferably between 12 and 15 may be used. Commercially available non-ionic surfactant or mixtures of non-ionic surfactants include those available from Clariant GmbH under the brand GENAPOL™ such as GENAPOL™ X-80, a surfactant according to the above formula (I) in which m is 0 and GENAPOL™ PF 40 a surfactant in which both n and m are non-zero.

According to a further embodiment, a mixture of one or more surfactants according to formula (I) in which m is 0 with one or more surfactants according to formula (I) with n and m each being non-zero can be used. An example of such a mixture is a mixture of GENAPOL™ X-80 and GENAPOL™ PF40.

In a still further embodiment, one or more surfactants according to formula (I), in particular a surfactant according to formula (I) in which m is 0, is used in combination with one or more polysorbate. Polysorbates are ethoxylated sorbitan fatty esters and are well known as emulsifiers. Useful polysorbates include polysorbate 20, polysorbate 40, polysorbate 60 and polysorbate 80. Polysorbate 80 may be represented by the following formula:

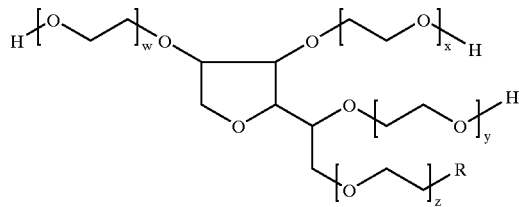

[Sum of w,x,y,z is 20; R is $(C_{17}H_{33})COO$]

Polysorbate 20, 40 and 60 have a very similar structure as polysorbate 80. Polysorbate 20, is a laurate ester of sorbitol and its anhydrides having approximately twenty moles of ethylene oxide for each mole of sorbitol and sorbitol anhydrides. Polysorbate 40 is a palmitate ester of sorbitol and its anhydrides having approximately twenty moles of ethylene oxide for each mole of sorbitol and sorbitol anhydrides. Polysorbate 60 is a mixture of stearate and palmitate esters of sorbitol and its anhydrides having approximately twenty moles of ethylene oxide for each mole of sorbitol and sorbitol anhydrides. Generally, the weight ratio of the polysorbate(s) to the surfactant(s) according to formula (I) will be between 1:2 and 1:8, preferably between 1:3 and 1:7.

According to yet another embodiment, a VTT of at least 26° C. may be obtained with a surfactant mixture comprising one or more surfactants according to formula (I) wherein m is preferably 0 and alkoxylated acetylenic diols, preferably ethoxylated acetylenic diols. The ethoxylated acetylenic diols for use in this embodiment preferably have a HLB between 11 and 16. Commercially available ethoxylated acetylenic diols that may be used include those available under the SURFYNOL brand from Air Products, in particular SURFYNOL™ 465. Generally, the weight ratio of ethoxylated acetylenic diols to the surfactant(s) according to formula (I) will be between 1:2 and 1:8, preferably between 1:3 and 1:7.

A still further mixture of non-ionic surfactants that can be used in connection with the present invention to yield a VTT of at least 26° C. for the dispersion includes a mixture of one or more surfactants according to formula (I) wherein m=0, one or more surfactants according to formula (I) wherein m and n are each non-zero and one or more polysorbates. Also, the dispersion may comprise a mixture of one or more surfactants according to formula (I), one or more polysorbates and one or more ethoxylated acetylenic diols.

The fluoropolymer contained in the fluoropolymer dispersion is a polymer that has a partially or fully fluorinated backbone. Typically the fluoropolymer is a polymer that has a backbone that is at least 40% by weight fluorinated, preferably at least 50% by weight, more preferably at least 60% by weight. The fluoropolymer may also have a fully fluorinated backbone such as for example in PTFE. The fluoropolymer may be a homo- or copolymer and the dispersion may contain a mixture of different fluoropolymers. Examples of fluoropolymers include copolymers of tetrafluoroethylene which can be processed from the melt, especially those of tetrafluoroethylene/hexafluoropropylene, tetrafluoroethylene/perfluoro(alkylvinyl) ethers with perfluoroalkyl radicals having 1 to 5 C atoms, in particular perfluoro(n-propyl-vinyl) ethers, tetrafluoroethylene/ethylene, tetrafluoroethylene/trifluorochloroethylene, trifluorochloroethylene/ethylene, tetrafluoroethylene/vinylidene fluoride and hexafluoropropylene/vinylidene fluoride, and terpolymers of tetrafluoroethylene/perfluoro(alkylvinyl) ether/hexafluoropropylene, tetrafluoroethylene/ethylene/hexafluoropropylene and tetrafluoroethylene/vinylidene fluoride/hexafluoropropylene, or of quaternary polymers of tetrafluoroethylene/vinylidene fluoride/hexafluoropropylene/perfluoro(alkylvinyl) ethers and tetrafluoroethylene/ethylene/hexafluoropropylene/perfluoro(alkylvinyl) ethers. Further fluoropolymers that can be used in the dispersion include polyvinyl fluoride, polyvinylidene fluoride and polytrifluorochloroethylene. The dispersion may also comprise polymers that cannot be processed from the melt such as polytetrafluoroethylene, that is to say of the homopolymer and which can optionally contain modifying comonomers, such as hexafluoropropylene or perfluoro(alkylvinyl) ethers or chlorotrifluoroethylene, in small proportions (0.1 to 3 mol %). The use of a non-ionic surfactant mixture to obtain a VTT of a least 28° C. is particularly adapt for dispersion of non-melt processible PTFE.

The average particle size (average particle diameter) of the fluoropolymer in the dispersion is generally in the range of 10 nm to 400 nm, preferably between 25 nm and 400 nm. The average particle diameter is generally determined through dynamic light scattering and a number average particle diameter may thereby be determined. The dispersion may be mono-modal as well as multi-modal such as bimodal. The amount of fluoropolymer in the dispersion is typically at least 35% by weight, for example between 40% by weight and 65% by weight.

The fluoropolymer dispersions can be used to coat a substrate and generally has good film properties comparable or better than similar dispersions that contain aromatic group containing non-ionic surfactants such as TRITON™ X-100. For example the fluoropolymer dispersions may be used to coat a metal substrate, polymeric substrates such as polyester and polypropylene substrates or to coat paper. The fluoropolymer dispersions may also be used to coat or impregnate textile or fabrics, in particular glass fiber substrates. Before coating, the fluoropolymer dispersion may be mixed with further ingredients to prepare a coating composition as may be desired for the particular coating application. For example, the fluoropolymer dispersion may be combined with polyamide imide and polyphenylene sulfone resins as disclosed in for example WO 94/14904 to provide anti-stick coatings on a substrate. Further coating ingredients include inorganic fillers such as colloidal silica, aluminum oxide, and inorganic pigments as disclosed in for example EP 22257 and U.S. Pat. No. 3,489,595.

The fluoropolymer dispersions are generally obtained by starting from a so-called raw dispersion, which may result from an emulsion polymerization of fluorinated monomer. Such dispersion may be free of low molecular weight fluorinated surfactant if the polymerization has been conducted in the absence of a low molecular weight fluorinated surfactant but will generally contain substantial amounts of low molecular weight fluorinated surfactant. If the concentration of low molecular weight fluorinated surfactant in the dispersion is more than a desired level, e.g. above 0.025% by weight, at least part thereof should be removed.

According to one embodiment to reduce the amount of low molecular weight fluorinated surfactant, a non-ionic surfactant, e.g. as disclosed above is added to the fluoropolymer dispersion and the fluoropolymer dispersion is then contacted with an anion exchanger. Such a method is disclosed in detail in WO 00/35971. Suitable anion exchangers include those that have a counterion corresponding to an acid having a $pK_a$ value of at least 3.

The anion exchange process is preferably carried out in essentially basic conditions. Accordingly, the ion exchange resin will preferably be in the OH⁻ form although anions like fluoride or oxalate corresponding to weak acids may be used as well. The specific basicity of the ion exchange resin is not very critical. Strongly basic resins are preferred because of their higher efficiency in removing the low molecular weight fluorinated surfactant. The process may be carried out by feeding the fluoropolymer dispersion through a column that contains the ion exchange resin or alternatively, the fluoropolymer dispersion may be stirred with the ion exchange resin and the fluoropolymer dispersion may thereafter be isolated by filtration. With this method, the amount of low molecular weight fluorinated surfactant can be reduced to levels below 150 ppm or even below 10 ppm. Accordingly, dispersions substantially free of low molecular weight fluorinated surfactant may thereby be obtained.

In case the low molecular weight fluorinated surfactant is in its free acid form is steam-volatile, the following method may be used to reduce the amount of low molecular weight fluorinated surfactant. A steam-volatile fluorinated surfactant in its free acid form may be removed from aqueous fluoropolymer dispersions, by adding a nonionic surfactant to the aqueous fluoropolymer dispersion and, at a pH-value of the aqueous fluoropolymer dispersion below 5, removing the steam-volatile fluorinated surfactant by distillation until the concentration of steam-volatile fluorinated surfactant in the dispersion reaches the desired value. Low molecular weight fluorinated surfactant that can be removed with this process include for example the surfactants according to formula A above.

It will generally be desirable to increase the amount of fluoropolymer solids in the dispersion. To increase the amount of fluoropolymer solids, any of the upconcentration techniques may be used. These upconcentration techniques are typically carried out in the presence of a non-ionic surfactant which is added to stabilize the dispersion in the upconcentration process. The amount of non-ionic surfactant that should generally be present in the dispersion for upconcentration is typically between 1% by weight and 12% by weight, preferably between 3% by weight and 10% by weight. Suitable methods for upconcentration include ultrafiltration, thermal upconcentration, thermal decantation and electrodecantation as disclosed in GB 642,025.

The method of ultrafiltration comprises the steps of (a) adding non-ionic surfactant to a dispersion that desirably is to be upconcentrated and (b) circulating the dispersion over a semi-permeable ultra-filtration membrane to separate the dispersion into a fluorinated polymer dispersion concentrate and an aqueous permeate. The circulation is typically at a conveying rate of 2 to 7 meters per second and affected by pumps, which keep the fluorinated polymer free from contact with components which cause frictional forces. The method of ultrafiltration further has the advantage that during upconcentration also some low molecular weight fluorinated surfactant is removed. Accordingly, the method of ultrafiltration may be used to simultaneously reduce the level of low molecular weight fluorinated surfactant and upconcentrate the dispersion.

To increase the fluoropolymer solids in the aqueous dispersion, thermal decantation may also be employed. In this method, a non-ionic surfactant is added to the fluoropolymer dispersion that is desirably upconcentrated and the dispersion is then heated so as to form a supernatant layer that can be decanted and that typically contains water and some non-ionic surfactant while the other layer will contain the concentrated dispersion. This method is for example disclosed in U.S. Pat. No. 3,037,953 and EP 818506.

Thermal upconcentration involves heating of the dispersion and removal of water under a reduced pressure until the desired concentration is obtained.

In accordance with the present invention, the anionic surfactant to control viscosity is added prior to or after the upconcentration depending on the method of upconcentration used. For example, if ultrafiltration is used, it will generally be preferred to add the anionic surfactant subsequent to the upconcentration to avoid loss thereof in the ultrafiltration. If the thermal upconcentration method is used, the anionic surfactant can be added prior to the upconcentration as well as subsequent to the upconcentration.

As disclosed above, the procedure of upconcentration and/or reduction of the amount of low molecular fluorinated surfactant may already involve the addition of non-ionic non-fluorinated surfactant to the dispersion. Accordingly, by appropriate selection of the non-ionic surfactant or surfactant mixture added to the upconcentration and/or removal of low molecular weight fluorinated surfactant, the dispersion resulting may already have the desired VTT in accordance with this invention. However, it is also possible to adjust the non-ionic surfactant mixture following upconcentration and/or removal of fluorinated surfactant, by adding one or more further non-ionic surfactants to the dispersion. Of course, the use of an aromatic group containing non-ionic surfactant should be avoided in the upconcentration and/or removal process as it is generally difficult to remove non-ionic surfactant from the dispersion.

The invention will now be further illustrated with reference to the following examples, without however the intention to limit the invention thereto.

EXAMPLES

Abbreviations:

PTFE: polytetrafluoroethylene

APFOA: ammonium salt of perfluorooctanoic acid

Genapol™ X-080: non-ionic EO containing surfactant, HLB 13, commercially available from Clariant GmbH Genapol™ PF40: non-ionic EO/PO containing surfactant, commercially available from Clariant GmbH Polystep™ A-16: Sodium dodecylbenzyl sulphonate, available from Stepan Company Hostapur™ SAS 30: secondary alkyl sulphonate sodium salt (paraffin sulphonate), available from Clariant GmbH Polysorbate 60: polyoxyethylene sorbitan monostearate, HLB 14.9, available from BASF Polysorbate 20: polyoxyethylene sorbitan monostearate, HLB 16.7, available from BASF Surfynol™ 465: ethoxylated acetylenic glycol, HLB 13, available from Air Products Surfynol™ 440: ethoxylated acetylenic glycol, HLB 8, available from Air Products Test Methods:

Viscosity

The viscosity of the dispersions was measured using a Brookfield Rheometer DV-III, spindle 86 at 20 D/l/s.

Critical Film Thickness (CFT)

A container was filled with the homogeneous fluorochemical dispersion. Excess foam was removed using a pipette. A degreased aluminum plate (19×4×4 mm$^3$) was dipped in the dispersion and dried with the plate hanging under an angle of 45°. The plate was allowed to dry for 5 min, after which it was heated at 380° C. during 10 min. The plate was cooled and the coating was evaluated for cracks using a microscope. The max crack fee thickness ($\mu$m) was measured using a Minitest 4000 thickness meter.

Viscosity Temperature Transition (VTT)

The viscosity temperature transition represents the viscosity-temperature dependence of the aqueous dispersion. It is obtained by measuring the viscosity of the fluoropolymer dispersion, while heating the sample between 20° C. and 50° C. and checking the viscosity every 1° C. The VTT point is the temperature at which the viscosity rises at least 10% above the viscosity measured at 20° C.

Surface Tension

The surface tension was measured by means of a clean, flamed platinum plate, using a tensiometer (Krüss), according to ASTM D1331.

Example 1

A fluoropolymer dispersion of PTFE with a particle size of about 220 nm and having a solids content of 25% by weight was obtained from an emulsion polymerization. To the dispersion were added 5% by weight of Genapol™ X-080 based on the amount of solids in the dispersion. The dispersion contained about 0.1% by weight of APFOA based on total weight of the dispersion (=4350 ppm based on polymer solids). The emulsion polymer was contacted with an anion exchange resin so as to reduce the amount of APFOA in the dispersion to 7 ppm based on total weight of the dispersion (=30 ppm based on polymer solids). The dispersion was upconcentrated through ultrafiltration to an amount of PTFE solids of 60% by weight. 2000 ppm of A16 surfactant were added based on amount of solids and the amount of Genapol™ X-080 was adjusted to 5% by weight based on solids to account for loss of this surfactant in the upconcentration. The resulting dispersion had a viscosity of 22 mPa, a VTT of 28° C., a surface tension of 28.9 dynes and a CFT of 9 $\mu$m. The dispersion thus obtained was suitable for coating for example metal substrates.

Examples 2 to 14

In examples 2 to 14, the same procedure as outlined in example 1 was repeated, but Genapol™ X-080 was replaced by surfactants or mixtures of surfactants as given in table 1. Examples 2 to 10 were made with 2000 ppm A16 as non-fluorinated anionic surfactant; examples 11 to 14 were made with 400 ppm Hostapur™ SAS 30 as non-fluorinated anionic surfactant. For all the emulsions, the viscosity, VTT, surface tension and CFT were measured. All of the emulsions had a VTT of at least 28. The results are given in table 1. Also recorded in table 1 are the HLB values of the surfactant mixtures.

Comparative Examples C-1 to C-5

Comparative examples C-1 to C-3 and C-5 were made in the same way as examples 1 to 14, except that surfactants or mixtures thereof were used leading to dispersions having low VTT or having a too high viscosity, as is given in table 1. Comparative example C-4 was made using a aromatic group containing non-ionic surfactant. Comparative example C-4 further contained the fluorinated surfactant in amount of 0.1% by weight based on solids and did not contain an anionic hydrocarbon surfactant.

As can be seen from below table, the dispersions according to the invention have good to improved film forming properties as evidenced by the critical film thickness. Further, the dispersions according to the invention can be readily coated over a broad range of temperature. The comparative examples do not have good coating properties as either the viscosity at 20° C. is too high or the VTT is too low. Further, the dispersions according to the present invention have better wetting properties than comparative C-4, which uses a aromatic group containing non-ionic surfactant.

| Ex No | Surfactant 1 | Surfactant 2 | Surfactant 3 | HS | Viscosity mPa · s (20° C.) | VTT | Surface tension (dynes/cm) | CFT($\mu$) | HLB |
|---|---|---|---|---|---|---|---|---|---|
| 1 | 5% Gen. X080 | / | / | A16 | 22 | 28.5 | 28.4 | 8 | 13 |
| 2 | 5% Gen. X080 | 1% Gen. PF40 | / | A16 | 26 | >35 | 28.9 | 9 | NA |
| 3 | 5% Gen. X080 | 1% Surfynol 465 | / | A16 | 23 | >35 | 28.8 | 11 | 13 |
| 4 | 6% Gen. X080 | 1% Surfynol 465 | / | A16 | 26 | 34.5 | 29.1 | 9 | 13 |
| 5 | 6% Gen. X080 | 1% Gen. PF40 | / | A16 | 27 | >35 | 29.0 | 8 | NA |
| 6 | 6% Gen. X080 | 1% Polysorbate 60 | / | A16 | 23 | 29 | 29.9 | 15 | 13.3 |
| 7 | 7% Gen. X080 | 1% Gen. PF40 | 1.5% Surfynol 465 | A16 | 32 | 34 | 33.7 | 22 | NA |
| 8 | 5% Gen. X080 | 2% Polysorbate 60 | / | A16 | 26 | 35 | 29.9 | 18 | 13.5 |

-continued

| Ex No | Surfactant 1 | Surfactant 2 | Surfactant 3 | HS | Viscosity mPa · s (20° C.) | VTT | Surface tension (dynes/cm) | CFT($\mu$) | HLB |
|---|---|---|---|---|---|---|---|---|---|
| 9 | 5% Gen. X080 | 2% Polysorbate 60 | 0.5% Surfynol 465 | A16 | 37 | >35 | 29.2 | 12 | 13.6 |
| 10* | 6% Gen. X080 | 2% Polysorbate 60 | / | A16 | 30 | 29 | 31.0 | 11 | 13.4 |
| 11 | 5% Gen. X080 | 2% Polysorbate 20 | / | SAS 30 | 23 | >35 | NA | 14 | 13.5 |
| 12** | 5% Gen. X080 | 1% Polysorbate 20 | / | SAS 30 | 19 | 29 | 29.8 | 13 | 13.7 |
| 13 | 5% Gen. X080 | 3% Polysorbate 20 | / | SAS 30 | 10 | >35 | 29.1 | 15 | 14.4 |
| 14 | 5% Gen. X080 | 2% Polysorbate 20 | / | SAS 30 | 14 | >35 | 29.7 | 16 | 14.7 |
| C-1 | 7% Gen. X080 | 2% Polysorbate 20 | / | SAS 30 | 309 | / | / | / | 13.8 |
| C-2 | 7% Gen. X080 | 2% Polysorbate 20 | / | A16 | 19 | 22 | 29.9 | 19 | 13.8 |
| C-3 | 5% Gen. X080 | 1.5% Surfynol 465 | 0.5% Surfynol 440 | A16 | 12 | 22 | 29 | 12 | |
| C-4** | 6% TRITON X100 | / | / | / | 20 | >35 | 32 | 8 | NA |
| C-5** | 6% Gen. X080 | / | | A16 | 34 | 23 | 29 | 22 | 13 |

Note:
*made with fluorochemical emulsions containing 59% PTFE by weight;
**made with fluorochemical emulsions containing 60%; all the other emulsions contained 58.5% PTFE.
HS = non-fluorinated anionic surfactant.

What is claimed is:

1. Fluoropolymer dispersion comprising fluoropolymer particles having an average particle size of 10 to 400 nm dispersed in water, said dispersion having a solids content between 35 and 70% by weight, said dispersion being free of fluorinated surfactant having a molecular weight of less than 1000 g/mol or containing said fluorinated surfactant having a molecular weight of less than 1000 g/mol in an amount of not more than 0.05% by weight based on the total weight solids of said dispersion, said dispersion further comprising a non-ionic non-fluorinated surfactant or mixture of non-ionic non-fluorinated surfactants and one or more non-fluorinated anionic surfactants, characterized in that the amount and nature of said non-ionic non-fluorinated surfactant or mixture of non-ionic non-fluorinated surfactants is selected such that the Viscosity Transition Temperature (VTT) of said fluoropolymer dispersion is at least 26° C. and that the fluoropolymer dispersion is essentially free of aromatic group containing non-ionic surfactants.

2. Fluoropolymer dispersion according to claim 1 wherein said non-ionic non-fluorinated surfactant or mixture of non-ionic non-fluorinated surfactants can be represented by the general formula:

$$R^1\text{—O—}[CH_2CH_2O]_n\text{—}[R^2O]_m\text{—}R^3 \quad (I)$$

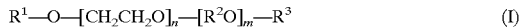

wherein $R^1$ represents an aliphatic hydrocarbon group having at least 8 carbon atoms, $R^2$ represents an alkylene having 3 carbon atoms, $R^3$ represents hydrogen or a $C_1$–$C_3$ alkyl group, n has a value of 0 to 40, m has a value of 0 to 40 and the sum of n+m being at least 2.

3. Fluoropolymer dispersion according to claim 2 wherein m is 0 and wherein said non-ionic non-fluorinated surfactant or mixture of non-ionic non-fluorinated surfactants has a Hydrophilic Lypophilic Balance (HLB) between 11 and 16.

4. Fluoropolymer dispersion according to claim 2 wherein said fluoropolymer dispersion comprises a mixture of non-ionic non-fluorinated surfactants comprising one or more non-ionic non-fluorinated surfactants according to formula (I) wherein m is 0 and one or more non-ionic non-fluorinated surfactants according to formula (I) wherein n and m each are different from 0.

5. Fluoropolymer dispersion according to claim 2 wherein said fluoropolymer dispersion comprises one or more non-ionic non-fluorinated surfactants according to formula (I) and one or more polysorbates.

6. Fluoropolymer dispersion according to claim 2 wherein said fluoropolymer dispersion comprises one or more non-ionic non-fluorinated surfactants according to formula (I) and one or more ethoxylated acetylenic diols.

7. Fluoropolymer dispersion according to claim 6 wherein said ethoxylated acetylenic diols have an HLB between 11 and 16.

8. Fluoropolymer dispersion according to claim 1 wherein the fluoropolymer comprises polytetrafluoroethylene.

9. A method comprising, coating or impregnating a substrate with the fluoropolymer dispersion as defined in claim 1.

10. A method according to claim 9 wherein said substrate comprises metal substrates, glass fiber fabrics, polymeric substrata and paper.

11. Method of providing a fluoropolymer particle dispersion comprising:

(a) providing a fluoropolymer dispersion comprising fluoropolymer particles having an average particle size of 10 to 400 nm and comprising fluorinated surfactant having a molecular weight of less than 1000 g/mol or being free thereof;

(b) reducing the amount of said fluorinated surfactant in said dispersion if the amount thereof is more than 0.05% by weight based on the total weight of solids of the dispersion in the presence of a non-ionic non-fluorinated surfactant or mixture of non-ionic non-fluorinated surfactants;

(c) upconcentrating the fluoropolymer dispersion in the presence of a non-ionic non-fluorinated surfactant or mixture of non-ionic non-fluorinated surfactants so as to increase the amount of fluoropolymer solids in said dispersion to a level between 35% and 75% by weight; and (d) adding one or more non-fluorinated anionic surfactants to the fluoropolymer dispersion prior to or after upconcentrating said fluoropolymer dispersion;

wherein said non-ionic non-fluorinated surfactant or mixture of non-ionic non-fluorinated surfactants used in said step (b) and/or (c) are selected such that the fluoropolymer dispersion after step (d) has a Viscosity Transition Temperature (VTT) of at least 26° C. or alternatively, further one or more non-ionic non-fluorinated surfactants are added to adjust the Viscosity Transition Temperature (VTT) of the fluoropolymer dispersion to at least 26° C. and wherein said non-ionic non-fluorinated surfactants are selected such that the fluoropolymer dispersion is free from aromatic coup containing non-ionic surfactant.

* * * * *

UNITED STATES PATENT AND TRADEMARK OFFICE
CERTIFICATE OF CORRECTION

PATENT NO. : 6,861,466 B2
DATED : March 1, 2005
INVENTOR(S) : Dadalas et al.

It is certified that error appears in the above-identified patent and that said Letters Patent is hereby corrected as shown below:

Column 3,
Line 24, "envirorunentally" should be shown as -- environmentally --

Column 4,
Lines 17 and 18, "mpa*s" should be shown as -- mPa*s -- (all instances)

Column 14,
Line 31, "substrata" should be shown as -- substrates --
Line 64, "coup" should be shown as -- group --

Signed and Sealed this

Seventh Day of June, 2005

JON W. DUDAS
*Director of the United States Patent and Trademark Office*